(12) United States Patent
Morita et al.

(10) Patent No.: US 7,605,519 B2
(45) Date of Patent: Oct. 20, 2009

(54) DYNAMOELECTRIC MACHINE

(75) Inventors: Masao Morita, Tokyo (JP); Masaya Inoue, Tokyo (JP); Kanji Shinkawa, Tokyo (JP); Toshiyuki Yoshizawa, Tokyo (JP); Moriyuki Hazeyama, Tokyo (JP); Shinji Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/189,387

(22) Filed: Aug. 11, 2008

(65) Prior Publication Data

US 2009/0066175 A1 Mar. 12, 2009

(30) Foreign Application Priority Data

Sep. 11, 2007 (JP) .............................. 2007-235218

(51) Int. Cl.
*H02K 1/22* (2006.01)
(52) U.S. Cl. ................................. 310/263; 310/156.72
(58) Field of Classification Search ................ 310/263, 310/156.66–156.69, 156.71–156.73, 156.08
See application file for complete search history.

(56) References Cited

U.S. PATENT DOCUMENTS

2004/0080235 A1* 4/2004 York ........................... 310/263

FOREIGN PATENT DOCUMENTS

JP 8-308190 11/1996
WO WO 2008/044347 A1 4/2008

OTHER PUBLICATIONS

U.S. Appl. No. 12/165,934, filed Jul. 1, 2008, Kanji Shinkawa, et al.
U.S. Appl. No. 12/141,370, filed Jun. 18, 2008, Masaya Inoue, et al.
U.S. Appl. No. 12/376,969, filed Feb. 10, 2009, Inoue et al.

* cited by examiner

*Primary Examiner*—Quyen Leung
*Assistant Examiner*—Leda Pham
(74) *Attorney, Agent, or Firm*—Oblon, Spivak, McClelland, Maier & Neustadt, L.L.P.

(57) ABSTRACT

A magnet seat is disposed on a second yoke portion and projects into respective spaces between circumferentially-adjacent pairs of second claw-shaped magnetic pole portions, and permanent magnets are disposed only near the second yoke portion so as to be held by the magnet seat so as to face an inner circumferential surface near a tip end of each of a plurality of first claw-shaped magnetic pole portions. Each of the permanent magnets is magnetically oriented in a reverse direction to an orientation of a magnetic field that a field coil produces.

4 Claims, 4 Drawing Sheets

| Alternator rotational frequency (rpm) | Conventional device generated power (A) | Present invention generated power (A) |
|---|---|---|
| 1300 | 34 | 49 |
| 2000 | 113 | 123 |
| 5000 | 160 | 162 |

DYNAMOELECTRIC MACHINE

BACKGROUND OF THE INVENTION

1. Field of the Invention

The present invention relates to a dynamoelectric machine such as an automotive alternator, etc., and particularly relates to a Lundell rotor construction to which permanent magnets are mounted.

2. Description of the Related Art

Automotive alternators that use Lundell rotors have been used in automobiles for decades. Loads from electrical equipment that has been mounted due to environmental issues have increased rapidly in recent years, and further increases in generated power have been sought from Lundell rotors.

If attempts are made to answer these demands within the scope of conventional design, the alternators are invariably increased in size. Increases in the size of alternators are undesirable since the weight of and space occupied by such alternators is increased. Increases in the size of alternators are also known to give rise to new problems such as leading to increased rotor inertia, and engine speed fluctuations and alternator inertial torque interacting and leading to belt vibration and slippage.

Consequently, there is demand to increase alternator capacity while maintaining alternator main body size in its present state.

Conventionally, means of disposing permanent magnets between claw-shaped magnetic poles that face each other in a Lundell rotor have been adopted in order to solve such problems (see Patent Literature 1 and 2, for example).

In a conventional technique according to Patent Literature 1, L-shaped grooves that have an outer circumferential surface that is slightly wider than an inner surface are formed on first and second circumferential end surfaces of claw-shaped magnetic poles, and permanent magnets are inserted into portions of the L-shaped grooves of claw-shaped magnetic poles that face each other in a circumferential direction. The permanent magnets that are disposed between the claw-shaped magnetic poles that face each other in the circumferential direction are prevented by the claw-shaped magnetic poles from moving due to centrifugal force that acts during rotation.

In a conventional technique according to Patent Literature 2, magnetic inserts that are formed so as to have a U shape are disposed between two consecutive magnetic pole fingers of a magnetic pole piece so as to extend below a tip end of a magnetic pole finger of another magnetic pole piece. These magnetic inserts are prevented from moving axially by a cooling fan, and are prevented from moving radially by the overlying magnetic pole fingers.

Patent Literature 1: Japanese Patent Laid-Open No. 2006-74969 (Gazette)

Patent Literature 2: Japanese Patent Laid-Open No. HEI 8-308190 (Gazette)

In automotive alternators of this kind, rotors rotate at high speeds in a vicinity of up to 18,000 to 20,000 rpm when driven by torque that is transmitted from an engine by means of belts and pulleys. Because of this, even if small magnets that weight only a few grams per pole are installed, extremely large centrifugal forces that exceed several tens of kilogram force act on the magnets. Large centrifugal forces also act on the claw-shaped magnetic poles, and the claw tip portions expand approximately 50 to 100 µm radially outward. Thus, the claw-shaped magnetic poles are displaced so as to flap with increases and decreases in engine rotational frequency.

In the conventional techniques according to Patent Literature 1 and 2, because the centrifugal forces that act on the permanent magnets are held by the claw-shaped magnetic poles themselves, which may displace, one problem has been that the permanent magnets may be damaged by the displacement of the claw-shaped magnetic poles, etc., reducing holding reliability for the permanent magnets.

In the conventional techniques according to Patent Literature 1 and 2, because the permanent magnets are disposed in a vicinity of a surface of the rotor, main magnetic flux or leakage flux of the permanent magnets may have components that cannot be kept inside the rotor and that interlink directly with the stator. Thus, induced voltages may arise during no-load de-energization.

In the conventional technique according to Patent Literature 1, due to the action of cooling fans, a portion of a cooling airflow that has been sucked into a case from a front end may flow rearward through the pole core, or a portion of a cooling airflow that has been sucked into the case from a rear end may flow forward through the pole core, and some problems have been that the cooling airflows may interfere with each other, generating loud interference noise, and that the quantity of the cooling airflows may also be reduced, reducing cooling effect.

In the conventional technique according to Patent Literature 2, on the other hand, because the magnetic inserts are disposed between two consecutive magnetic pole fingers of a magnetic pole piece so as to extend below a tip end of a magnetic pole finger of another magnetic pole piece, ventilation channels into the pole core for cooling airflows that have been sucked into the case from the front end and the rear end are blocked. Thus, although interference between the cooling airflows that have been sucked into the case from the front end and the rear end can be prevented, one problem has been that temperature increases in the field coil cannot be suppressed because the cooling airflows are prevented from flowing inside the pole core, reducing cooling effect.

SUMMARY OF THE INVENTION

The present invention aims to solve such problems and an object of the present invention is to provide a dynamoelectric machine that enables holding reliability for permanent magnets to be increased, occurrence of induced voltages during no-load de-energization to be suppressed, interference noise between cooling airflows to be reduced, and cooling efficacy to be increased.

In order to achieve the above object, according to one aspect of the present invention, there is provided a dynamoelectric machine including: a rotor having: a pole core having: a boss portion; first and second yoke portions that are disposed so as to extend radially outward from two axial end edge portions of the boss portion; and a plurality of first and second claw-shaped magnetic pole portions that are disposed so as to extend axially alternately from each of the first and second yoke portions, and that are arranged circumferentially so as to intermesh with each other, the pole core being fixed to a shaft that is inserted through a central axial position of the boss portion; and a field coil that is housed inside a space that is surrounded by the boss portion, the first and second yoke portions, and the plurality of first and second claw-shaped magnetic pole portions; first and second cooling fans that are respectively fixed to two axial ends of the pole core; a case that rotatably supports the shaft and houses the rotor internally, that has air intake apertures disposed through two axial end surfaces, and that has an air discharge aperture disposed through a radial side surface; and a stator having: a cylindrical stator core; and a stator coil that is installed in the stator core, the stator core being disposed so as to be held by the case so as to surround the rotor by means of a predetermined air gap. Further, the dynamoelectric machine includes: a plurality of airflow restricting members that are disposed in all spaces between circumferentially-adjacent pairs of second claw-shaped magnetic pole portions so as to restrict a cooling airflow, made by the second cooling fan; and a permanent magnet that is held by the airflow restricting member so as to face an inner circumferential surface near a tip end of the first claw-shaped magnetic pole portion and that is magnetically oriented in a reverse direction to an orientation of a magnetic field produced by the field coil.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Embodiment 1

Figure 1:
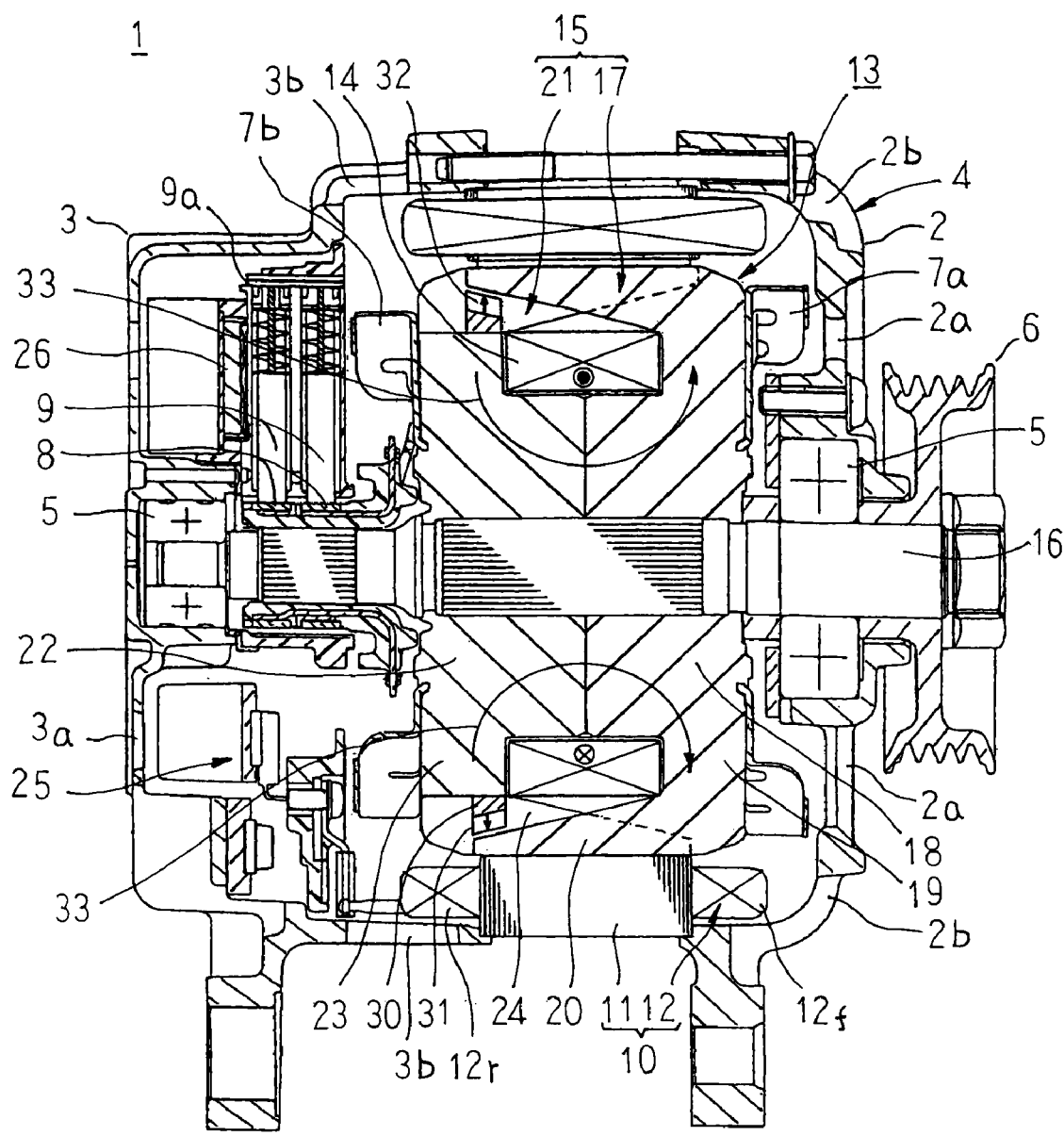
FIG. 1 is a cross section that schematically shows an automotive alternator according to Embodiment 1 of the present invention.
Figure 2:
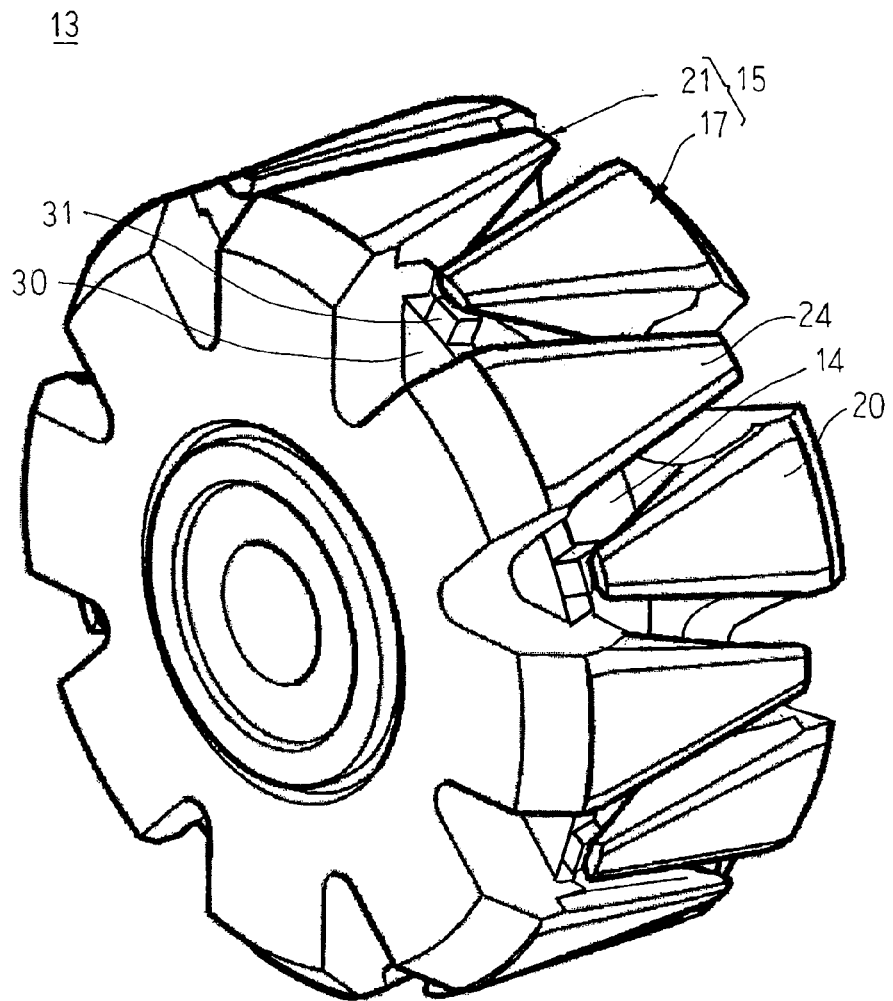
FIG. 2 is a perspective of a rotor that can be used in the automotive alternator according to Embodiment 1 of the present invention.
Figure 3:
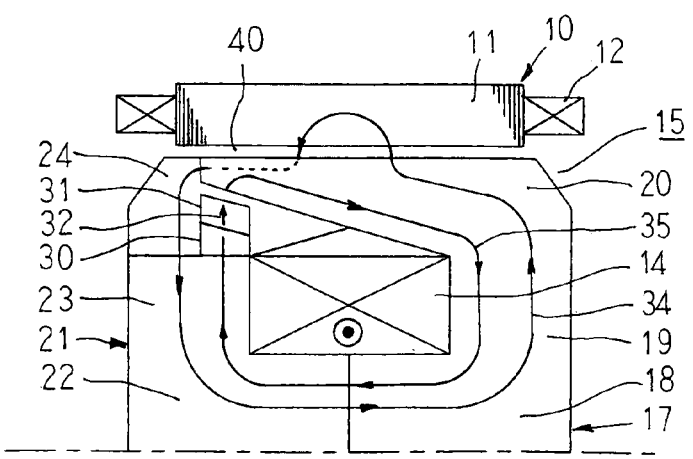
FIG. 3 is a schematic diagram for explaining flow of magnetic flux in the automotive alternator according to Embodiment 1 of the present invention.

FIG. 1 is a cross section that schematically shows an automotive alternator according to Embodiment 1 of the present invention, FIG. 2 is a perspective of a rotor that can be used in the automotive alternator according to Embodiment 1 of the present invention, and FIG. 3 is a schematic diagram for explaining flow of magnetic flux in the automotive alternator according to Embodiment 1 of the present invention.

In FIGS. 1 and 2, an automotive alternator 1 includes: a case 4 that is constituted by a front bracket 2 and a rear bracket 3 that are each made of aluminum so as to have an approximate cup shape; a rotor 13 that is rotatably disposed inside the case 4 such that a shaft 16 is supported by means of bearings 5 in the case 4; a pulley 6 that is fixed to an end portion of the shaft 16 that projects outward at a front end of the case 4; first and second cooling fans 7a and 7b that are fixed to two axial end surfaces of the rotor 13; a stator 10 that is fixed to the case 4 so as to surround an outer circumference of the rotor 13 so as to have a constant air gap relative to the rotor 13; a pair of slip rings 8 that are fixed to a rear end of the shaft 16, and that supply current to the rotor 13; a pair of brushes 9 that are disposed inside the case 4 so as to be housed inside a brush holder 9a and slide on the respective slip rings 8; a rectifier 25 that is fixed to an inner wall surface of the rear bracket 3 so as to face the rotor 13, and that rectifies an alternating current that is generated in the stator 10 into direct current; and a voltage regulator 26 that is fixed to the brush holder 9a, and that adjusts magnitude of an alternating voltage generated in the stator 10.

The stator 10 includes: a cylindrical stator core 11 in which slots that open toward an inner circumferential side are arranged circumferentially; and a stator coil 12 that is installed in the stator core 11, and in which an alternating current arises due to changes in magnetic flux that accompany rotation of the rotor 13 from a field coil 14 that is described below.

The rotor 13 includes: a field coil 14 that generates magnetic flux on passage of an excitation current; a pole core 15 that is disposed so as to cover the field coil 14 and in which magnetic poles are formed by that magnetic flux; and the shaft 16 that is fitted through a central axial position of the pole core 15.

The pole core 15 is constructed so as to be divided into first and second pole core bodies 17 and 21 that are each prepared by a cold forging manufacturing method using a low carbon steel such as S10C, for example.

The first pole core body 17 has: a first boss portion 18 that has an outer circumferential surface that has a cylindrical shape, and through which a shaft insertion aperture is disposed at a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight first claw-shaped magnetic pole portions 20, for example, are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially.

The second pole core body 21 has: a second boss portion 22 that has an outer circumferential surface that has a cylindrical shape, and through which a shaft insertion aperture is disposed at a central axial position; a thick ring-shaped second yoke portion 23 that is disposed so as to extend radially outward from a second end edge portion of the second boss portion 22; and second claw-shaped magnetic pole portions 24 that are disposed so as to extend toward a first axial end from outer circumferential portions of the second yoke portion 23. Eight second claw-shaped magnetic pole portions 24, for example, are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially.

The first and second pole core bodies 17 and 21 that are configured in this manner are fixed to the shaft 16 that has been fitted through the shaft insertion apertures such that the first and second claw-shaped magnetic pole portions 20 and 24 alternately intermesh and a second end surface of the first boss portion 18 is abutted to a first end surface of the second boss portion 22. The field coil 14, which has been wound onto a bobbin (not shown), is mounted in a space that is surrounded by the first and second boss portions 18 and 22, the first and second yoke portions 19 and 23, and the first and second claw-shaped magnetic pole portions 20 and 24.

A magnet seat 30 is prepared by a cold forging manufacturing method using a magnetic material such as a low carbon steel such as S10C, for example. The magnet seat 30 is fixed onto outer circumferential surfaces of the second yoke portion 23 that face inner circumferential surfaces near tip ends of each of the first claw-shaped magnetic pole portions 20 using adhesive, etc., so as to be magnetically connected. Upper surfaces of the magnet seat 30 are formed so as to be approximately parallel to the inner circumferential surfaces of the first claw-shaped magnetic pole portions 20. In addition, permanent magnets 31 are formed so as to have parallelogrammatic cross sections, and are fixed to the upper surfaces of the magnet seat 30 so as to face the inner circumferential surfaces near the tip ends of the first claw-shaped magnetic pole portions 20 using adhesive, etc., so as to be magnetically connected. Here, the upper surfaces of each of the permanent magnets 31 are approximately parallel to the inner circumferential surfaces of the first claw-shaped magnetic pole portions 20 and have a predetermined clearance. The magnet seat 30 projects into respective spaces between circumferentially-adjacent pairs of the second claw-shaped magnetic pole portions 24 so as to approximately block the spaces in question. Moreover, it is desirable for a radial position of the upper surfaces of the magnet seat 30 to be greater than or equal to an outside diameter of the second cooling fan 7b in order to block the spaces in question. The magnet seat 30 constitutes an airflow restricting member that restricts a cooling airflow from the second cooling fan 7b and prevents the cooling airflow from entering interior portions of the rotor 13.

The permanent magnets 31 are magnetically oriented so as to have a direction of magnetization 32 that is opposite to the orientation of a magnetic field 33 that the field current that flows through the field coil 14 produces in a plane that is perpendicular to a central axis of the rotor 13. In other words, if the magnetic field 33 is generated in the direction of the arrow as shown in FIG. 1 when an electric current is passed through the field coil 14, the permanent magnets 31 are magnetically oriented in a reverse direction to the magnetic field 33. In this case, the directions of magnetization 32 of the permanent magnets 31 are aligned radially, and extensions of the directions of magnetization 32 are directed at inner circumferential surfaces near the tip ends of the facing first claw-shaped magnetic pole portions 20. Moreover, in the case of a design in which the orientation of the magnetic field 33 that the field current that flows through the field coil 14 produces is inverted, the permanent magnets 31 will also be magnetically oriented in a reverse direction.

A plurality of front-end air intake apertures 2a are disposed through an axial end surface of the front bracket 2 so as to be arranged in a row circumferentially around an outer circumferential side of the bearing 5, and a plurality of front-end air discharge apertures 2b are disposed through a radial side surface of the front bracket 2 so as to be arranged in a row circumferentially around an outer circumferential side of front-end coil ends 12f of the stator coil 12. A plurality of rear-end air intake apertures 3a are disposed through an axial end surface of the rear bracket 3 so as to be arranged in a row circumferentially around an outer circumferential side of the bearing 5, and a plurality of rear-end air discharge apertures 3b are disposed through a radial side surface of the rear bracket 3 so as to be arranged in a row circumferentially around an outer circumferential side of rear-end coil ends 12r of the stator coil 12.

Next, operation of an automotive alternator 1 that is configured in this manner will be explained.

First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portion 24 of the second pole core body 21 are magnetized into South-seeking (S) poles.

At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier 25 to charge the battery or to be supplied to electric loads, etc.

The first and second cooling fans 7a and 7b are driven to rotate together with the rotation of the rotor 13. Thus, a cooling airflow is sucked into the case 4 at the front end through the front-end air intake apertures 2a by the rotation of the first cooling fan 7a. A portion of the cooling airflow that has been sucked into the case 4 through the front-end air intake apertures 2a flows into the rotor 13 through gaps between circumferentially-adjacent pairs of the first claw-shaped magnetic pole portions 20, cools the field coil 14, and reaches the permanent magnets 31. The cooling airflow that has reached the permanent magnets 31 is prevented by the magnet seat 30 and the permanent magnets 31 from flowing out rearward, is deflected centrifugally by a centrifugal fan effect from the second claw-shaped magnetic pole portions 24, cools the rear-end coil ends 12r of the stator coil 12, and is then discharged outside the case 4 through the rear-end air discharge apertures 3b. The remainder of the cooling airflow that has been sucked into the case 4 through the front-end air intake apertures 2a is deflected centrifugally by the first cooling fan 7a, cools the front-end coil ends 12f, and is then discharged outside the case 4 through the front-end air discharge apertures 2b.

At the same time, a cooling airflow is sucked into the case 4 at the rear end through the rear-end air intake apertures 3a by the rotation of the second cooling fan 7b. The cooling airflow that has been sucked into the case 4 through the rear-end air intake apertures 3a cools the rectifier 25, then flows axially, and reaches the rotor 13. Here, because the gaps between the circumferentially-adjacent pairs of second claw-shaped magnetic pole portions 24 are blocked by the magnet seat 30 and the permanent magnets 31, the cooling airflow that has reached the rotor 13 is prevented from flowing into the rotor 13, and is deflected centrifugally by the second cooling fan 7b. The cooling airflow that has been deflected centrifugally cools the rear-end coil ends 12r, and is then discharged outside the case 4 through the rear-end air discharge apertures 3b.

Thus, heat-generating parts such as the rectifier 25, the stator coil 12, and the field coil 14, etc., are cooled by the cooling airflows, preventing excessive temperature increases.

A first pole core body has been disposed at a front end and a second pole core body has been disposed at a rear end, but a first pole core body may also be disposed at the rear end and a second pole core body disposed at the front end. In either case, the pole core body on which the airflow restricting member is disposed is the second pole core body. A rectifier may also be disposed at the front end, or may also be disposed outside the dynamoelectric machine.

Next, operation of the magnetic flux will be explained with reference to FIG. 3.

First, magnetic flux 34 is generated when an electric current is passed through the field coil 14. This magnetic flux 34 enters tooth portions of the stator core 11 by passing through the air gap 40 from the first claw-shaped magnetic pole portions 20. The magnetic flux 34 then moves circumferentially through a core back portion from the tooth portions of the stator core 11, and enters neighboring second claw-shaped magnetic pole portions 24 by passing through the air gap 40 from the tooth portions that face those second claw-shaped magnetic pole portions 24. Next, the magnetic flux 34 that has entered the second claw-shaped magnetic pole portions 24 passes through the second yoke portion 23, the second boss portion 22, the first boss portion 18, and the first yoke portion 19, and reaches the first claw-shaped magnetic pole portions 20. Now, in a conventional Lundell rotor, because the first and second pole core bodies are at their design limit, they are magnetically saturated by the magnetic field that is generated by the field coil, reducing magnetic flux that is generated by the rotor.

In Embodiment 1, the permanent magnets 31 are magnetically oriented so as to be opposite to the orientation of the magnetic field 33 that is generated by the field coil 14. Thus, the orientation of the magnetic field that originates from the permanent magnets 31 is in a reverse direction to the magnetic field 33 that is generated by the field coil 14. To interlink with the stator core 11, it is necessary for the magnetic flux 35 that originates from these permanent magnets 31 to make a round trip across the air gap 40, which has a large magnetic resistance. The permanent magnets 31 are disposed radially inside the first claw-shaped magnetic pole portions 20, and are disposed so as to circuit in a shorter magnetic path length than the inner circumferential surface side of the first claw-shaped magnetic pole portions 20. Thus, a large portion of the magnetic flux 35 forms a closed magnetic circuit inside the rotor without going around through the stator core 11.

In other words, the magnetic flux 35 that originates from the permanent magnets 31 enters the first claw-shaped magnetic pole portions 20 by means of the air gap, passes through the first yoke portion 19, the first boss portion 18, the second boss portion 22, the second yoke portion 23, and the magnet seat 30, and returns to the permanent magnets 31.

Thus, the magnetic flux 35 that originates from the permanent magnets 31 is in a reverse direction from the magnetic flux 34 that originates from the field coil 14, enabling the magnetic flux density of the magnetic bodies that constitute the first and second pole core bodies 17 and 21 to be reduced significantly, thereby enabling magnetic saturation to be relieved.

Figures 4, 5:
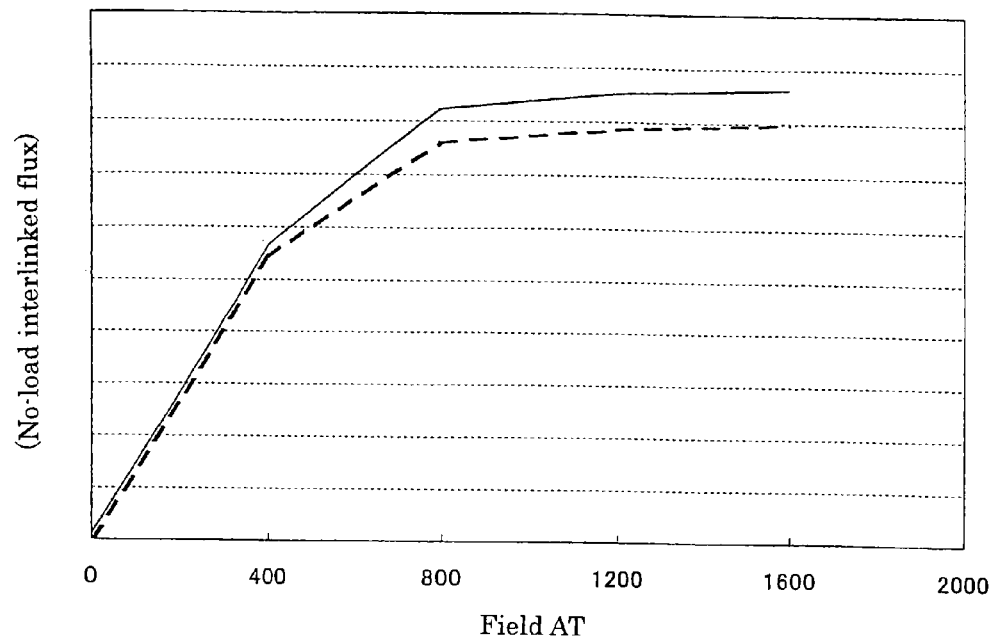
FIG. 4 is a graph that represents a relationship between field ampere turns (field AT) and stator interlinked magnetic flux in the automotive alternator according to Embodiment 1 of the present invention.
FIG. 5 is a table that shows generated power relative to rotational frequency in the automotive alternator according to Embodiment 1 of the present invention.

Next, stator interlinked magnetic flux relative to field ampere turns (field AT) and generated power relative to rotational frequency were measured using an automotive alternator 1 that was configured in this manner, and the results are shown in FIGS. 4 and 5. For comparison, a conventional device from which the permanent magnets 31 were omitted was prepared, stator interlinked magnetic flux relative to field ampere turns (field AT) and generated power (direct current A) relative to rotational frequency were measured, and the results are also shown in FIGS. 4 and 5. Moreover, in FIG. 4, a solid line represents the present invention, and a broken line represents the comparative device.

It can be seen from FIG. 4 that the difference between the automotive alternator 1 and the conventional device is small in a region in which field AT is small, and the difference between the automotive alternator 1 and the conventional device increases when a region in which magnetic saturation begins is exceeded. In other words, it can be seen that disposing the permanent magnets 31 relieves magnetic saturation, thereby increasing the amount of magnetic flux that interlinks with the stator 10.

Similarly, it can be seen from FIG. 5 that greater generated power can be obtained in the automotive alternator 1 than in the conventional device, particularly in a low rotational frequency range.

In other words, in conventional devices, 30 percent or more of the magnetomotive force of the field is expended in the magnetic circuit of the rotor as a result of magnetic saturation, making it difficult to increase the amount of magnetic flux. In Embodiment 1, on the other hand, because magnetic saturation is relieved as described above, it can be inferred that the magnetic flux that interlinks with the stator 10 is increased, increasing generated power. In particular, it has been confirmed that generated power can be increased significantly in a low-speed idling region where magnetic saturation is pronounced.

In Embodiment 1, because the permanent magnets 31 are disposed so as to face inner circumferential surfaces of the first claw-shaped magnetic pole portions 20, the permanent magnets 31 are positioned radially inside an external surface of the rotor 13. Thus, stator slot harmonics are confined to surface sections of the first and second claw-shaped magnetic pole portions 20 and 24, and do not act to heat the permanent magnets 31 by direct induction. As a result, the permanent magnets 31 are prevented from being heated and thermally demagnetized.

Because the permanent magnets 31 are disposed so as to face the inner circumferential surfaces of the first claw-shaped magnetic pole portions 20, the magnetic circuit of the permanent magnets 31 is a closed magnetic circuit inside the rotor, eliminating magnetic flux components that interlink with the stator 10. Thus, the occurrence of voltages induced by the permanent magnets 31 during no-load de-energization is suppressed. As a result, the magnet volume of the permanent magnets 31 can be increased.

The permanent magnets 31 are mounted onto the magnet seat 30. Thus, because the permanent magnets 31 are positioned radially inside the first claw-shaped magnetic pole portions 20, centrifugal forces that act on the permanent magnets 31 are reduced, enabling the holding construction for the permanent magnets 31 to be simplified. Because the permanent magnets 31 are not affected by the first and second claw-shaped magnetic pole portions 20 and 24, which are displaced greatly relative to centrifugal force, holding of the permanent magnets 31 is facilitated, and the occurrence of cracking or chipping of the permanent magnets 31 that may result from the displacement of the first and second claw-shaped magnetic pole portions 20 and 24 is suppressed. In addition, because the permanent magnets 31 are not affected by axial displacement between the claw-shaped magnetic pole portions that results from thermal expansion of the rotor, holding of the permanent magnets 31 is also facilitated if the present invention is applied to automotive alternators that have a wide temperature range. Because of these facts, the holding reliability for the permanent magnets 31 is improved.

Because the permanent magnets 31 are positioned radially inside the first claw-shaped magnetic pole portions 20, increases in moment of inertia that result from the permanent magnets 31 being disposed can be reduced, also enabling increases in inertia torque to be suppressed.

Because the magnet seat 30 is fixed onto outer circumferential surfaces of the second yoke portion 23 that are opposite inner circumferential surfaces near the tip ends of each of the first claw-shaped magnetic pole portions 20 and the permanent magnets 31 are fixed to the upper surfaces of the magnet seat 30 so as to face the inner circumferential surfaces near the tip ends of each of the first claw-shaped magnetic pole portions 20, spaces between circumferentially-adjacent pairs of second claw-shaped magnetic pole portions 24 are blocked by the magnet seat 30 and the permanent magnets 31. Thus, inflow into the rotor 13 of the cooling airflow that has been sucked into the case 4 due to the rotation of the second cooling fan 7b is reduced. On the other hand, the cooling airflow that has been sucked into the case 4 due to the rotation of the first cooling fan 7a and has subsequently flowed into the rotor 13, flows radially outward due to the centrifugal fan effect from the second claw-shaped magnetic pole portion 24 without flowing out rearward from inside the rotor 13. Thus, a ventilation channel for the cooling airflow that has been sucked into the case 4 by the first cooling fan 7a and a ventilation channel for the cooling airflow that has been sucked into the case 4 by the second cooling fan 7b are separated. The quantity of the two cooling airflows is thereby increased, increasing the cooling efficacy, and also reducing noise that results from interference between the two cooling airflows.

If alternator capacity is increased while maintaining alternator main body size in its present state, the quantity of heat generated in the stator coil 12, the field coil 14, and the rectifier 25 increases, giving rise to excessive temperature increases. According to Embodiment 1, because cooling efficacy is increased as described above, the heat generated in the stator coil 12, the field coil 14, and the rectifier 25 is radiated effectively even if alternator capacity is increased while maintaining alternator main body size in its present state, suppressing excessive temperature increases.

Now, ventilation resistance in the ventilation channel at the rear end where the rectifier 25 is disposed is increased, reducing the quantity of cooling airflow that flows through the ventilation channel at the rear end. Thus, if a portion of the cooling airflow that flows through the ventilation channel at the rear end where the rectifier 25 is disposed flows into the rotor 13, the quantity of cooling airflow that is supplied to the cooling of the rear-end coil ends 12r decreases significantly, reducing cooling efficacy. If the cooling airflow that flows into the rotor 13 has been warmed by the rectifier 25, the field coil 14 also cannot be cooled effectively.

In Embodiment 1, the permanent magnets 31 are held by the magnet seat 30 that is disposed on a yoke portion near where the rectifier 25 is disposed, i.e., on the second yoke portion 23. Thus, all of the cooling airflow that has been sucked in through the rear-end air intake apertures 3a is supplied to the rear-end coil ends 12r without flowing into the rotor 13. Because the cooling airflow that has been sucked in through the front-end air intake apertures 2a flows into the rotor 13 in a low-temperature state without being warmed by the rectifier 25, the field coil 14 can be cooled effectively. In addition, because the cooling airflow that has been sucked in through the front-end air intake apertures 2a has a low temperature, the front-end coil ends 12f can be cooled effectively even if the flow rate is reduced by an amount proportionate to that which flows into the rotor 13.

In this embodiment, spaces that allow airflow from the first cooling fan to enter into the rotor are disposed between all circumferentially-adjacent first claw-shaped magnetic pole portions. Permanent magnets that have been magnetized in a reverse direction to the magnetic field from the field coil may also be disposed in these spaces so as to face inner circumferential surfaces of the second claw-shaped magnetic pole portions. The number and arrangement of the permanent magnets that face the inner circumferential surfaces of the second claw-shaped pole portions should be decided so as to allow for a trade off with increases in the quantity of power generated in a low rotational frequency range and deterioration in cooling due to disposition of the permanent magnets. If the permanent magnets are disposed so as to face the inner circumferential surfaces of some of the second claw-shaped magnetic pole portions, consideration will also be given to maintaining the mechanical and magnetic balance of the rotor. This also applies to other embodiments.

Embodiment 2

Figure 6:
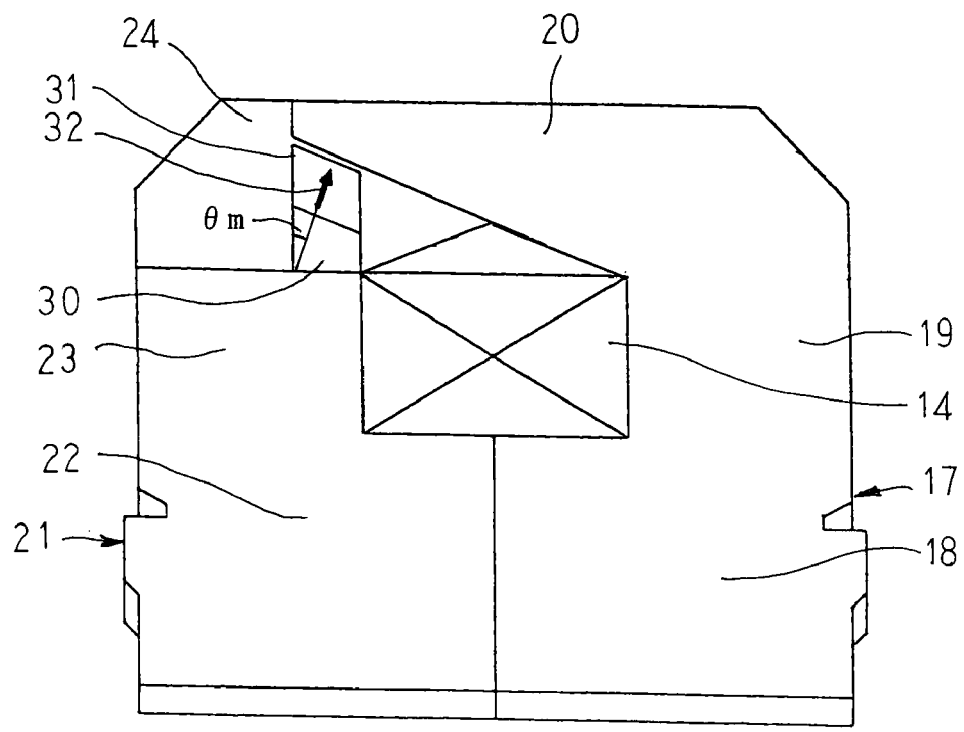
FIG. 6 is a schematic diagram for explaining direction of magnetization of permanent magnets in an automotive alternator according to Embodiment 2 of the present invention.

In Embodiment 1 above, the directions of magnetization 32 of the permanent magnets 31 are aligned in a radial direction, but in Embodiment 2, directions of magnetization 32 of permanent magnets 31 are directed toward inner circumferential surfaces near tip ends of first claw-shaped magnetic pole portions 20 so as to be inclined toward a field coil 14 relative to the radial direction, as shown in FIG. 6. Moreover, the rest of this embodiment is configured in a similar manner to Embodiment 1 above.

In FIG. 6, the permanent magnets 31 are formed so as to have parallelogrammatic cross sections, and are fixed to upper surfaces of the magnet seat 30 so as to face the inner circumferential surfaces near the tip ends of the first claw-shaped magnetic pole portions 20 using adhesive, etc., so as to be magnetically connected. The upper surfaces of the permanent magnets 31 are approximately parallel to the inner circumferential surfaces of the first claw-shaped magnetic pole portions 20 so as to have a predetermined clearance. The directions of magnetization 32 of the permanent magnets 31 are inclined in a plane that includes the central axis of the rotor 13 (the central axis of the shaft 16) by an angle θm toward the field coil 14 relative to the radial direction (a plane that is perpendicular to the central axis of the rotor 13).

First, problems when the directions of magnetization 32 are aligned radially will be explained in order to explain the effects of inclining the directions of magnetization 32 of the permanent magnets 31 in the plane that includes the central axis of the rotor 13 by an angle θm toward the field coil 14 relative to the plane that is perpendicular to the central axis of the rotor 13 (the radial direction).

As shown in FIG. 3, the magnetic flux 34 that the field coil 14 produces enters the stator core 11 from the first claw-shaped magnetic pole portions 20 via the air gap 40, and reenters the second claw-shaped magnetic pole portion 24 via the air gap 40. At this time, it is easier for the magnetic flux 34 to enter the stator core 11 from root base portions of the first claw-shaped magnetic pole portions 20, and components of the magnetic flux 34 are reduced closer to the tip ends. Similarly, it is easier for the magnetic flux 34 to enter the root base portion of the second claw-shaped magnetic pole portions 24 from the stator core 11, and the components of the magnetic flux 34 are reduced closer to the tip ends.

If the directions of magnetization 32 are aligned radially under such conditions, the magnetic flux 35 that the permanent magnets 31 produce enters the tip end portions of the first claw-shaped magnetic pole portions 20 from the permanent magnets 31. There the magnetic flux 35 that flows through the tip end regions of the first claw-shaped magnetic pole portions 20, which have a small magnetic path cross-sectional area, is not canceled out by the magnetic flux 34 that the field coil 14 produces. As a result, the magnetic paths at the tip end portions of the first claw-shaped magnetic pole portions 20 become magnetically saturated, reducing the amount of magnetic flux that is applied to the rotor 13 by the permanent magnets 31. In other words, the utilization factor of the permanent magnets 31 is reduced.

Here, by inclining the directions of magnetization 32 of the permanent magnets 31 by an angle θm toward the field coil 14 relative to the radial direction, the magnetic flux 35 from the permanent magnets 31 passes through spaces in regions between the permanent magnets 31 and the first claw-shaped magnetic pole portions 20 that are closer to the field coil 14, and enters the first claw-shaped magnetic pole portions 20 from regions of the tip end portions of the first claw-shaped magnetic pole portions 20 that are closer to the root bases. Thus, the magnetic paths at the tip end portions of the first claw-shaped magnetic pole portions 20 are no longer magnetically saturated.

Because magnetic saturation in the tip end portions of the first claw-shaped magnetic pole portions 20 is thereby avoided compared to when the magnetic flux 35 passes through the tip end portions of the first claw-shaped magnetic pole portions 20 (when the directions of magnetization 32 are aligned radially), the utilization factor of the magnetic flux from the magnets can be increased.

Here, because the entry pathway of the magnetic flux into iron and the exit pathway of the magnetic flux from iron are perpendicular to the surface of the iron, it is desirable to make the directions of magnetization of the magnets perpendicular to the surface of the iron. In other words, it is desirable for the directions of magnetization 32 of the permanent magnets 31 to be perpendicular to the inner circumferential surfaces near the tip ends of the facing first claw-shaped magnetic pole portions 20.

Effects that improve the utilization efficiency of the magnetic flux of a permanent magnet by making the direction of magnetization of the permanent magnet perpendicular to the inner circumferential surfaces of the facing claw-shaped magnetic pole portions can be achieved not only in this embodiment, but also in any dynamoelectric machine that has at least one permanent magnet that is held in a position that faces an inner circumferential surface of a claw-shaped magnetic pole portion that is magnetically oriented in a reverse direction to the orientation of the magnetic field that the field coil produces.

Embodiment 3

Figure 7:
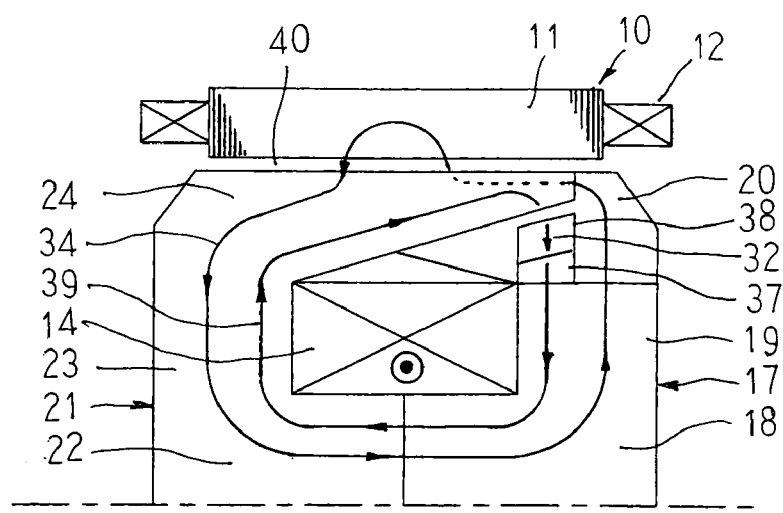
FIG. 7 is a schematic diagram for explaining flow of magnetic flux in an automotive alternator according to Embodiment 3 of the present invention.

In Embodiment 1 above, the permanent magnets 31 are held on the magnet seat 30 that is disposed on the second yoke portion 23, but in Embodiment 3, permanent magnets 38 are held on a magnet seat 37 that is disposed on a first yoke portion 19, as shown in FIG. 7.

Moreover, the rest of this embodiment is configured in a similar manner to Embodiment 1 above.

In FIG. 7, the magnet seat 37 is prepared by a cold forging manufacturing method using a magnetic material such as a low carbon steel such as S10C, for example. The magnet seat 37 is fixed onto outer circumferential surfaces of the first yoke portion 19 that face inner circumferential surfaces near tip ends of each of the second claw-shaped magnetic pole portions 24 using adhesive, etc., so as to be magnetically connected. Upper surfaces of the magnet seat 37 are formed so as to be approximately parallel to the inner circumferential surfaces of the second claw-shaped magnetic pole portions 24. In addition, the permanent magnets 38 are formed so as to have parallelogrammatic cross sections, and are fixed to upper surfaces of the magnet seat 37 so as to face the inner circumferential surfaces near the tip ends of the second claw-shaped magnetic pole portions 24 using adhesive, etc., so as to be magnetically connected. Here, the upper surfaces of each of the permanent magnets 38 are approximately parallel to the inner circumferential surfaces of the second claw-shaped magnetic pole portions 24 so as to have a predetermined clearance. The magnet seat 37 projects into respective spaces between circumferentially-adjacent pairs of the first claw-shaped magnetic pole portions 20 so as to approximately block the spaces in question.

The permanent magnets 38 are magnetically oriented so as to have a direction of magnetization 32 that is opposite to the orientation of a magnetic field 33 that the field current that flows through the field coil 14 produces in a plane that is perpendicular to a central axis of the rotor 13.

In Embodiment 3, the first and second cooling fans 7a and 7b are driven to rotate together with the rotation of the rotor 13. Thus, a cooling airflow is sucked into the case 4 at the front end through the front-end air intake apertures 2a by the rotation of the first cooling fan 7a. Here, because the gaps between the circumferentially-adjacent pairs of the first claw-shaped magnetic pole portions 20 are blocked by the magnet seat 37 and the permanent magnets 38, the cooling airflow that has been sucked into the case 4 through the front-end air intake apertures 2a is prevented from flowing into the rotor 13, and is deflected centrifugally by the first cooling fan 7a. The cooling airflow that has been deflected centrifugally cools the front-end coil ends 12f, and is then discharged outside the case 4 through the front-end air discharge apertures 2b.

At the same time, a cooling airflow is sucked into the case 4 at the rear end through the rear-end air intake apertures 3a by the rotation of the second cooling fan 7b. The cooling airflow that has been sucked into the case 4 through the rear-end air intake apertures 3a cools the rectifier 25, then flows axially, and reaches the rotor 13. A portion of the cooling airflow that has reached the rotor 13 flows into the rotor 13 through gaps between circumferentially-adjacent pairs of the second claw-shaped magnetic pole portions 24, cools the field coil 14, and reaches the permanent magnets 38. The cooling airflow that has reached the permanent magnets 38 is prevented by the magnet seat 37 and the permanent magnets 38 from flowing out frontward, is deflected centrifugally by a centrifugal fan effect from the first claw-shaped magnetic pole portions 20, cools the front-end coil ends 12f of the stator coil 12, and is then discharged outside the case 4 through the front-end air discharge apertures 2b. The remainder of the cooling airflow that has reached the rotor 13 is deflected centrifugally by the second cooling fan 7b, cools the rear-end coil ends 12r, and is then discharged outside the case 4 through the rear-end air discharge apertures 3b.

Thus, in Embodiment 3, because the permanent magnets 38 are held on only the magnet seats 37 disposed on the first yoke portion 19, ventilation channels for the cooling airflows that have been sucked into the case 4 by the first and second cooling fans 7a and 7b are also separated, increasing the quantity of the two cooling airflows, and thereby increasing the cooling efficacy, and also reducing noise that results from interference between the two cooling airflows.

In Embodiment 3, the magnetic flux 34 that is generated by the field coil 14 also enters tooth portions of the stator core 11 by passing through the air gap 40 from the first claw-shaped magnetic pole portions 20. The magnetic flux 34 then moves circumferentially through the core back portion from the tooth portions of the stator core 11, and enters neighboring second claw-shaped magnetic pole portions 24 by passing through the air gap 40 from the tooth portions that face those second claw-shaped magnetic pole portions 24. Next, the magnetic flux 34 that has entered the second claw-shaped magnetic pole portions 24 passes through the second yoke portion 23, the second boss portion 22, the first boss portion 18, and the first yoke portion 19, and reaches the first claw-shaped magnetic pole portions 20. Now, in a conventional Lundell rotor, because the first and second pole core bodies are at their design limit, they are magnetically saturated by the magnetic field that is generated by the field coil, reducing magnetic flux that is generated by the rotor.

On the other hand, to interlink with the stator core 11, it is necessary for the magnetic flux 39 that originates from the permanent magnets 38 to make a round trip across the air gap 40, which has a large magnetic resistance. The permanent magnets 38 are disposed radially inside the second claw-shaped magnetic pole portions 24, and are disposed so as to circuit in a shorter magnetic path length than the inner circumferential surface side of the second claw-shaped magnetic pole portions 24. Thus, a large portion of the magnetic flux 39 forms a closed magnetic circuit inside the rotor without going around through the stator core 11.

In other words, the magnetic flux 39 that originates from the permanent magnets 38 passes from the magnet seat 37 through the first yoke portion 19, the first boss portion 18, the second boss portion 22, the second yoke portion 23, and the second claw-shaped magnetic pole portions 24, and returns to the permanent magnets 38. Thus, the magnetic flux 39 that originates from the permanent magnets 38 is in a reverse direction from the magnetic flux 34 that originates from the field coil 14, enabling the magnetic flux density of the magnetic bodies that constitute the first and second pole core bodies 17 and 21 to be reduced significantly, thereby enabling magnetic saturation to be relieved.

Moreover, in each of the above embodiments, explanations are given for automotive alternators, but the present invention is not limited to automotive alternators, and similar effects are also exhibited if the present invention is applied to other dynamoelectric machines such as automotive electric motors, automotive generator-motors, etc.

In each of the above embodiments, the permanent magnets are formed so as to have a parallelogrammatic cross section, but the permanent magnets are not limited to this shape, provided that they are designed appropriately with the magnet seat.

In each of the above embodiments, the magnet seat is prepared as a separate member from the pole core, but the magnet seat may also be prepared integrally with the pole core. Alternatively, the magnet seat may also be constituted by a plurality of members.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dynamoelectric machine comprising:
   a rotor comprising:
      a pole core having:
         a boss portion;
         first and second yoke portions that are disposed so as to extend radially outward from two axial end edge portions of said boss portion; and
         a plurality of first and second claw-shaped magnetic pole portions that are disposed so as to extend axially alternately from each of said first and second yoke portions, and that are arranged circumferentially so as to intermesh with each other,
      said pole core being fixed to a shaft that is inserted through a central axial position of said boss portion; and
      a field coil that is housed inside a space that is surrounded by said boss portion, said first and second yoke portions, and said plurality of first and second claw-shaped magnetic pole portions;
   first and second cooling fans that are respectively fixed to two axial ends of said pole core;
   a case that rotatably supports said shaft and houses said rotor internally, that has air intake apertures disposed through two axial end surfaces, and that has an air discharge aperture disposed through a radial side surface; and
   a stator comprising:
      a cylindrical stator core; and
      a stator coil that is installed in said stator core,
      said stator core being disposed so as to be held by said case so as to surround said rotor by means of a predetermined air gap;
   said dynamoelectric machine further comprising:
      a plurality of airflow restricting members that are disposed in all spaces between circumferentially-adjacent pairs of second claw-shaped magnetic pole portions so as to restrict a cooling airflow, made by said second cooling fan; and
      a permanent magnet that is held by said airflow restricting member so as to face an inner circumferential surface near a tip end of said first claw-shaped magnetic pole portion and that is magnetically oriented in a reverse direction to an orientation of a magnetic field produced by said field coil.

2. A dynamoelectric machine according to claim 1, further comprising:
   a rectifier that rectifies alternating current that is generated in said stator into direct current, mounted internally in said case near said second yoke portion of said pole core.

3. A dynamoelectric machine according to claim 1, wherein a direction of magnetization of said permanent magnet is directed at an inner circumferential surface of a facing first claw-shaped magnetic pole portion.

4. A dynamoelectric machine according to claim 3, wherein said direction of magnetization of said permanent magnet is perpendicular to said inner circumferential surface of said facing first claw-shaped magnetic pole portion.

* * * * *